United States Patent
Klenk et al.

(10) Patent No.: US 10,337,415 B2
(45) Date of Patent: Jul. 2, 2019

(54) METHOD FOR OPERATING AN INTERNAL COMBUSTION ENGINE

(71) Applicant: Daimler AG, Stuttgart (DE)

(72) Inventors: Rolf Klenk, Fellbach (DE); Christopher Scherer, Deining (DE)

(73) Assignee: Daimler AG, Stuttgart (DE)

(*) Notice: Subject to any disclaimer, the term of this patent is extended or adjusted under 35 U.S.C. 154(b) by 83 days.

(21) Appl. No.: 14/388,321

(22) PCT Filed: Mar. 26, 2013

(86) PCT No.: PCT/EP2013/000907
§ 371 (c)(1),
(2) Date: Sep. 26, 2014

(87) PCT Pub. No.: WO2013/143687
PCT Pub. Date: Oct. 3, 2013

(65) Prior Publication Data
US 2015/0047600 A1    Feb. 19, 2015

(30) Foreign Application Priority Data

Mar. 28, 2012  (DE) .................. 10 2012 006 342

(51) Int. Cl.
*F02B 3/00*  (2006.01)
*F02D 13/02*  (2006.01)
(Continued)

(52) U.S. Cl.
CPC ........ *F02D 13/0226* (2013.01); *F02B 17/005* (2013.01); *F02D 9/08* (2013.01);
(Continued)

(58) Field of Classification Search
CPC ..... Y02T 10/18; Y02T 10/123; Y02T 10/128; F02D 2041/001; F02D 13/0207; F02D 13/0226; F02D 41/402
(Continued)

(56) References Cited

U.S. PATENT DOCUMENTS 6,055,948 A     5/2000  Shiraishi et al.
6,659,073 B1 *  12/2003  Franke .................. F02D 35/027
                                                        123/299
(Continued)

FOREIGN PATENT DOCUMENTS

CN    101046177 A    10/2007
CN    101245738 A     8/2008
(Continued)

OTHER PUBLICATIONS

International Search Report (PCT/ISA/210) dated Aug. 5, 2013, with English translation (Five (5) pages).
(Continued)

*Primary Examiner* — Marguerite J McMahon
*Assistant Examiner* — James J Kim
(74) *Attorney, Agent, or Firm* — Crowell & Moring LLP

(57) ABSTRACT

A method for operating an internal combustion engine of a motor vehicle involves directly injecting fuel into a combustion chamber using an injection device, and a mixture of the fuel and air is ignited in the combustion chamber by an ignition device. The internal combustion engine is operated selectively in at least one first operating mode with at least one first valve lift of at least one gas exchange valve of the internal combustion engine, associated with the combustion chamber, or in at least one second operating mode with at least one second valve lift of the gas exchange valve, which is smaller than the first valve lift. For assisting a charge movement of the mixture in the second operating mode, at
(Continued)

Figure 1:
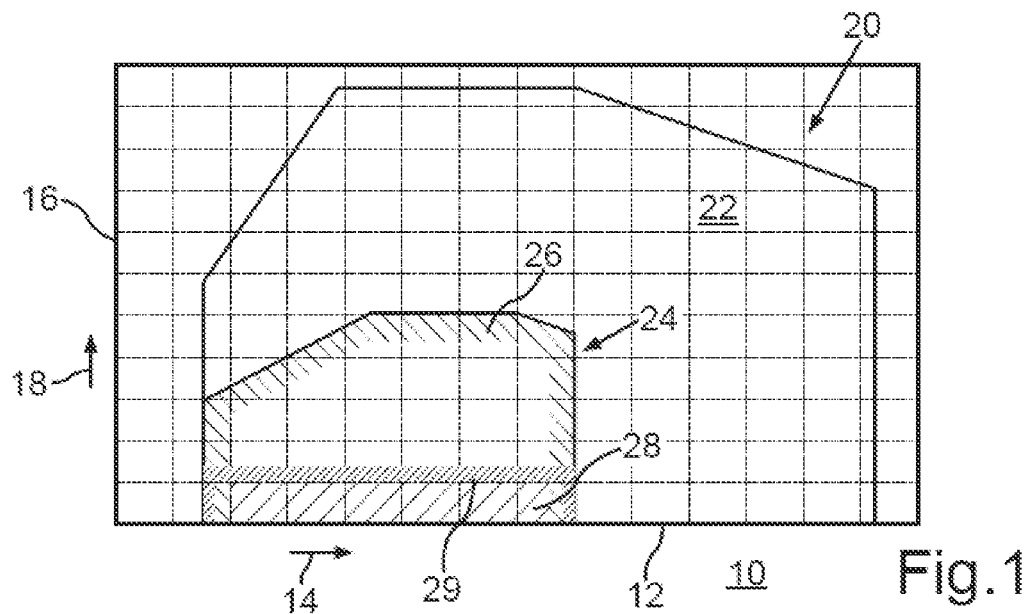

least one further injection of fuel directly into the combustion chamber is carried out prior to the ignition.

5 Claims, 2 Drawing Sheets

(51) Int. Cl.
    *F02D 41/30*     (2006.01)
    *F02B 17/00*     (2006.01)
    *F02D 9/08*     (2006.01)

(52) U.S. Cl.
    CPC ..... *F02D 13/0207* (2013.01); *F02D 41/3035* (2013.01); *Y02T 10/18* (2013.01)

(58) Field of Classification Search
    USPC .................. 123/294, 295, 299, 90.15, 90.16; 701/101–105
    See application file for complete search history.

(56) References Cited

U.S. PATENT DOCUMENTS

| | | | |
|---|---|---|---|
| 7,089,908 B2 | 8/2006 | Fujieda et al. | |
| 7,314,036 B2 | 1/2008 | Altenschmidt | |
| 7,974,766 B2* | 7/2011 | Rayl | F01L 1/185 123/90.15 |
| 7,975,672 B2* | 7/2011 | Kang | F02D 13/0219 123/321 |
| 8,468,823 B2* | 6/2013 | Hitomi | F02D 41/3035 123/564 |
| 2007/0055436 A1 | 3/2007 | Weiss et al. | |
| 2007/0227503 A1 | 10/2007 | Hitomi et al. | |
| 2008/0210195 A1 | 9/2008 | Saruwatari et al. | |
| 2008/0271436 A1* | 11/2008 | Najt | F01N 3/2006 60/285 |
| 2009/0018755 A1 | 1/2009 | Inoue | |
| 2009/0048761 A1* | 2/2009 | Kang | F02D 13/0219 701/103 |
| 2009/0095250 A1* | 4/2009 | Kuzuyama | F02B 1/12 123/27 R |
| 2010/0095918 A1* | 4/2010 | Cecur | F01L 13/0015 123/90.16 |
| 2010/0288236 A1* | 11/2010 | Ashizawa | F02B 23/10 123/478 |
| 2011/0108001 A1 | 5/2011 | Lee et al. | |
| 2011/0139099 A1* | 6/2011 | Roe | F01L 1/267 123/90.1 |
| 2012/0255520 A1* | 10/2012 | Grover, Jr. | F02F 3/28 123/445 |
| 2014/0102081 A1* | 4/2014 | Toner | F01N 3/101 60/295 |
| 2014/0311433 A1* | 10/2014 | Batchelor, Jr. | F01L 9/02 123/90.24 |

FOREIGN PATENT DOCUMENTS

| | | |
|---|---|---|
| CN | 101344046 A | 1/2009 |
| DE | 102 42 226 A1 | 3/2004 |
| DE | 10 2004 061 142 A1 | 7/2006 |
| DE | 103 41 070 B4 | 7/2006 |
| DE | 10 2010 012 127 B3 | 7/2011 |
| EP | 1 484 494 A2 | 12/2004 |
| JP | 55-29028 A | 3/1980 |
| JP | 2-146264 A | 6/1990 |
| JP | 3-279649 A | 12/1991 |
| JP | 10-141072 A | 5/1998 |
| JP | 2004-360524 A | 12/2004 |

OTHER PUBLICATIONS

German language Written Opiniono (PCT/ISA/237) dated Aug. 5, 2013 (Five (5) pages).
German Search Report dated Nov. 26, 2012, with English translation (Ten (10) pages).
Japanese-language Office Action issued in counterpart Japanese Application No. 2015-502137 dated Nov. 17, 2015 (Four (4) pages).
Chinese-language Office Action issued in counterpart Chinese Application No. 201380016744.6 dated Mar. 4, 2016 with English translation (Nine (9) pages).
Japanese-language Appeal Decision issued by the Japan Patent Office in counterpart Japanese Application No. 2015-502137 dated Sep. 26, 2017 with partial English translation (21 pages).

* cited by examiner

METHOD FOR OPERATING AN INTERNAL COMBUSTION ENGINE

BACKGROUND AND SUMMARY OF THE INVENTION

Exemplary embodiments of the invention relate to a method for operating an internal combustion engine.

German patent publication DE 102 42 226 A1 discloses a method for forming an ignitable fuel-air mixture in a combustion chamber of a spark-ignition internal combustion engine with direct injection, in which combustion air is supplied to a combustion chamber via at least one intake duct. Fuel is injected into the combustion chamber by a fuel injector situated in the combustion chamber. A fuel-air mixture that is formed is ignited by at least one spark plug situated in the combustion chamber, the fuel injection taking place in multiple partial quantities. During homogeneous operation of the internal combustion engine the fuel injection is designed in such a way that a first and a second partial quantity are introduced in the intake stroke, and a third partial quantity is introduced in the compression stroke, the ignition of the fuel-air mixture that is formed taking place at a distance between 0° crankshaft angle and 100° crankshaft angle after the end of the injection of the third partial quantity.

In addition, during stratified charge operation of the internal combustion engine the fuel injection is designed in such a way that a first, a second, and a third partial quantity are introduced into the combustion chamber in a compression stroke of the internal combustion engine, the fuel injection of the second partial quantity being ended at a crankshaft angle in a range between 15° crankshaft angle prior to ignition of the formed fuel-air mixture and 4° crankshaft angle after the ignition of the formed fuel-air mixture.

German patent publication DE 10 2004 061 142 A1 discloses a method for controlling an internal combustion engine. The internal combustion engine has a device for switching over the effective valve lift curves of charge cycle valves, a throttle valve that is controllable by a control device, and at least one controllable injection element, the request for a switchover being recognized prior to switching over the valve lift curves, and the throttle valve position being predictively changed prior to switching over the valve lift curves. At least after the predictive correction of the throttle valve position triggered by the switchover request, the desired setpoint torque and the actual torque are continuously determined, and the switchover of the effective valve lift curve is delayed with respect to the switchover request, the switchover time being determined from the rate of deviation of the actual torque from the setpoint torque.

It has been shown that during operation of an internal combustion engine, in particular a gasoline engine, having relatively small valve lifts of at least one gas exchange valve, in particular an intake valve, associated with a combustion chamber of the internal combustion engine, disadvantages may result with regard to a charge movement of the fuel-air mixture in the combustion chamber compared to larger valve lifts.

Exemplary embodiments of the present invention, therefore, are directed to a method for operating an internal combustion engine in which the disadvantages of the charge movement are at least very small or avoided.

In such a method for operating an internal combustion engine of a motor vehicle, at least one injection of fuel directly into at least one combustion chamber of the internal combustion engine is carried out by means of at least one injection device. In addition, ignition of a mixture of the fuel and air in the combustion chamber is carried out by means of an ignition device.

The internal combustion engine is operated selectively in at least one first operating mode with at least one first valve lift of at least one gas exchange valve of the internal combustion engine, associated with the combustion chamber, or in at least one second operating mode with at least one second valve lift that is smaller than the first valve lift. In other words, the injection and the ignition are carried out in both operating modes, the gas exchange valve in the first operating mode performing the first valve lift, and in the second operating mode performing the second valve lift, when the gas exchange valve opens and closes. The second valve lift is smaller than the first valve lift.

To now compensate for disadvantages of a smaller charge movement of the mixture in the second operating mode, with the second valve lift, in comparison to the first operating mode with the first, larger valve lift, for assisting the charge movement in the second operating mode, at least one further injection of fuel directly into the combustion chamber is carried out prior to the ignition. On account of assisting the charge movement due to the further injection, slower combustion in the second operating mode compared to the first operating mode may also be avoided, resulting in efficient operation of the internal combustion engine with low fuel consumption and low $CO_2$ emissions. The method according to the invention thus allows the provision of control times of the gas exchange valve or of at least one camshaft of the internal combustion engine that actuates the gas exchange valve, in the second operating mode, resulting in very low fuel consumption due to very low charge cycle work.

The further injection is preferably carried out close to the time of ignition. This results in particularly advantageous assistance of the charge movement, and thus, particularly advantageous turbulence of the mixture, in particular at the time of ignition, resulting in very high combustion stability. This is beneficial for the efficient operation of the internal combustion engine.

For providing very good charge movement, and thus, turbulence having a very good, beneficial effect on the combustion stability, it is preferably provided that the further injection is carried out after the at least one first injection.

In another advantageous embodiment of the invention, multi-spark ignition is carried out as the ignition, at least in the second operating mode. Particularly high combustion stability is thus achieved, resulting in very efficient operation of the internal combustion engine, which is designed, for example, as a reciprocating internal combustion engine.

In another advantageous embodiment, in the second operating mode the internal combustion engine is operated, at least for the most part, in homogeneous operation. In homogeneous operation, the mixture, in particular in comparison to a possible stratified charge operation of the internal combustion engine, is particularly homogeneous, thus enabling particularly efficient operation of the internal combustion engine.

The internal combustion engine may be operated, at least for the most part, in homogeneous operation in the first operating mode as well.

The fuel consumption and thus the $CO_2$ emissions of the internal combustion engine may be kept low particularly when a load setting of the internal combustion engine in the second operating mode is carried out by means of at least one throttle valve situated in an intake tract of the internal combustion engine and/or by means of a supercharging rate of at least one exhaust gas turbocharger associated with the internal combustion engine and/or by means of a phase adjustment of the camshaft, i.e., by means of a change in the control times of the gas exchange valve, which is designed in particular as an intake valve.

In another advantageous embodiment, the internal combustion engine is operated in the second operating mode when at least one value which characterizes at least a temperature of the internal combustion engine exceeds a predefined threshold value. The threshold value is 50° C., for example. Efficient operation of the internal combustion engine with low fuel consumption may be ensured in this way.

The gas exchange valve is preferably an intake valve, in the at least one open position of which air may flow into the combustion chamber from an intake tract of the internal combustion engine.

Further advantages, features, and particulars of the invention result from the following description of one preferred exemplary embodiment, and with reference to the drawings. The features and feature combinations mentioned above in the description as well as the features and feature combinations mentioned below in the description of the figures and/or only shown in the figures may be used not only in the particular stated combination, but also in other combinations or alone without departing from the scope of the invention.

BRIEF DESCRIPTION OF THE DRAWING FIGURES

Figure 2:
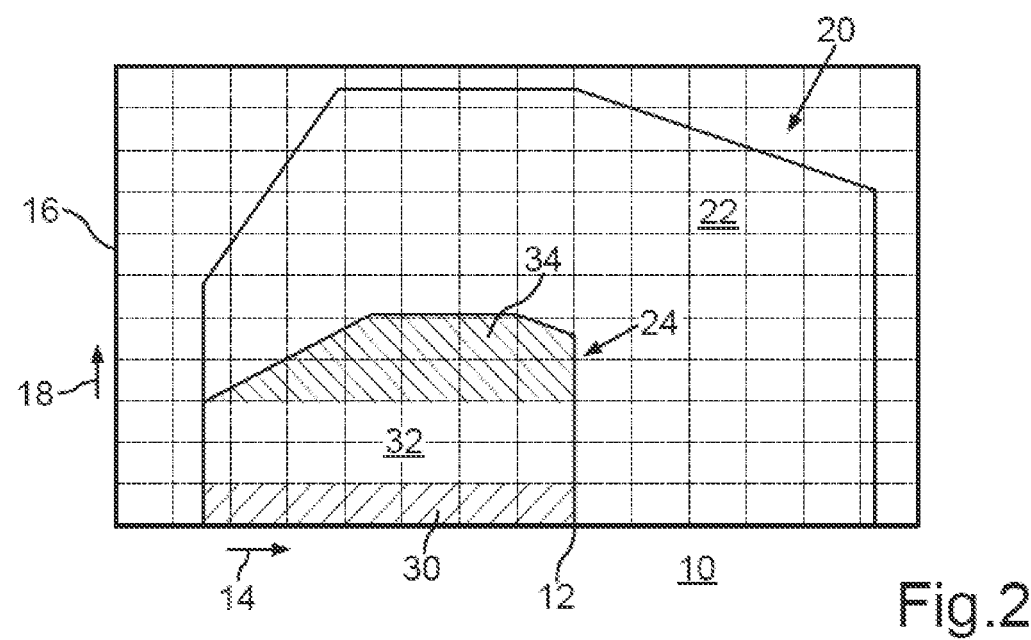

The drawings show the following:

FIG. 1 shows a schematic illustration of a characteristic map of a gasoline engine for a motor vehicle, having a first operating range of the internal combustion engine with a large valve lift of intake valves of the internal combustion engine, and a second operating range with a small valve lift of the intake valves, the illustration being used to depict a valve lift strategy of the internal combustion engine; and FIG. 2 shows another schematic illustration of the characteristic map according to FIG. 1, the illustration being used to depict a load control strategy of the gasoline engine.

Figure 3:
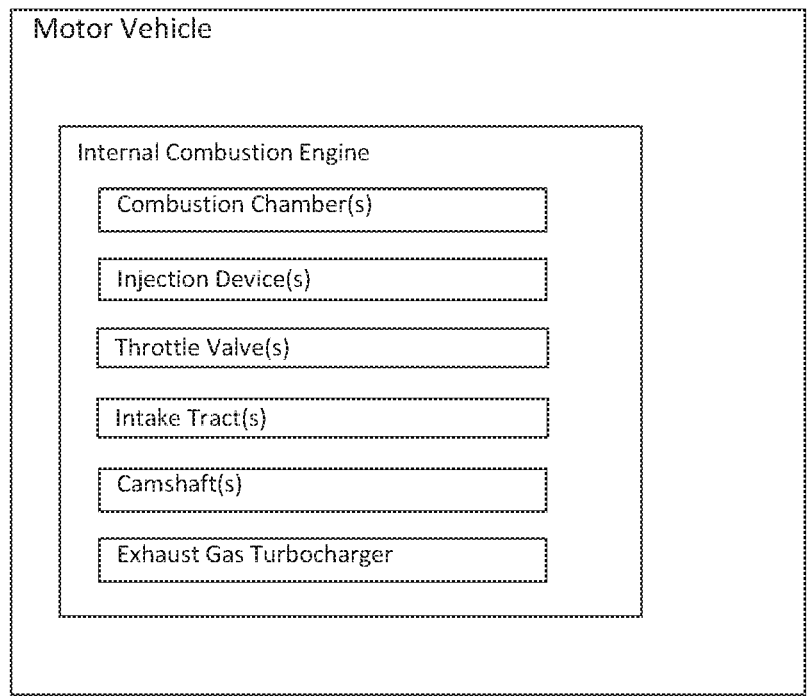

FIG. 3 shows a schematic illustration of a motor vehicle.

DETAILED DESCRIPTION

FIG. 1 shows a diagram 10, on the abscissa 12 of which the speed of a gasoline engine is plotted with increasing value according to a directional arrow 14. The load on the gasoline engine is plotted with increasing value on the ordinate 16 of the diagram 10 according to a directional arrow 18. The characteristic map 20 of the gasoline engine, which is used for illustrating a method for operating the gasoline engine, is depicted in the diagram 10.

As is apparent from FIG. 1, the characteristic map 20 has a first characteristic map range 22 and a second characteristic map range 24. The first characteristic map range 22 corresponds to a first operating mode of the gasoline engine in which the gasoline engine is operated with at least one first valve lift curve. The first valve lift curve brings about respective first valve lifts of intake valves of the gasoline engine.

The second characteristic map range 24 corresponds to a second operating mode of the gasoline engine in which the gasoline engine is operated with at least one second valve lift curve. The second valve lift curve brings about respective second valve lifts of the intake valves. The second valve lifts are smaller than the first valve lifts.

The intake valves of the gasoline engine are actuated via at least one camshaft, for example. This means that the camshaft cooperates with the intake valves, so that the intake valves, depending on the operating mode, carry out their respective valve lifts and correspondingly open and close.

For providing the various valve lifts, the camshaft includes, for example, respective first cams associated with the first valve lifts, and respective second cams associated with the second valve lifts. The camshaft cooperates with the intake valves via its cams.

The gasoline engine is selectively operable in the first operating mode (first characteristic map range 22) or in the second operating mode (second characteristic map range 24). In a so-called fired operation of the gasoline engine, in both operating modes respective injections of fuel of the gasoline engine are carried out directly in combustion chambers, in particular cylinders, of the gasoline engine. For this purpose, at least one injector by means of which fuel is injected directly into the associated combustion chamber is associated with each of the combustion chambers.

In addition, in each case at least one of the intake valves is associated with the combustion chambers. When the intake valves are in an open position, air flowing through an intake tract of the gasoline engine via intake ducts may flow into the respective combustion chambers and mix with the fuel that is injected directly into the combustion chambers. This results in a fuel-air mixture that is ignited and which subsequently combusts.

For igniting the particular fuel-air mixture in the combustion chamber, at least one spark plug, for example, by means of which an ignition spark is generated is associated with each of the combustion chambers. The point in time at which the ignition spark is generated and the fuel-air mixture is thus ignited is referred to as the ignition point. The point in time at which the fuel is injected directly into the respective combustion chambers is referred to as the injection point.

When the gasoline engine is operated in the second operating mode, the intake valves do not open as wide as in the first operating mode, since they carry out smaller second valve lifts. In other words, in the second operating mode the intake valves open up smaller opening cross-sections, via which the air may flow into the respective combustion chambers, than in the first operating mode. As is apparent from FIG. 1, in the second operating mode the gasoline engine is operated at predefined loads and/or speeds, while the first operating mode is set at comparatively higher loads and/or speeds. This means that at relatively low speeds and/or loads the gasoline engine is operated in the second operating mode, and at comparatively higher speeds and/or loads is operated in the first operating mode. If the speed and/or the load exceed(s) at least one predefined threshold value, a switchover is made from the second operating mode into the first operating mode, and vice versa.

In the second operating mode the gasoline engine is operated for the most part in homogeneous operation, the second characteristic map range 24 having a hysteresis range 26 with regard to load and speed.

In order to now compensate for or avoid a smaller charge movement of the fuel-air mixture in the second operating mode in comparison to the first operating mode due to the smaller second valve lifts, for assisting the charge movement of the fuel-air mixture in the second operating mode at least one further injection of fuel into the combustion chambers is carried out close to the time of ignition. A very advantageous charge movement or turbulence is thus achieved resulting in very high combustion stability of the combustion of the fuel-air mixture. Control times of the at least one camshaft may thus be achieved resulting in very low fuel consumption and thus low $CO_2$ emissions of the gasoline engine due to very low charge cycle work.

In the present case, the second characteristic map range 24 has a sub-range 28 in which the internal combustion engine is also operated as a function of the load and/or speed, and in which the at least one further injection of fuel is carried out directly in the respective combustion chambers prior to the ignition, in particular close to the time of ignition, of the fuel-air mixture. In other words, a so-called ignition injection is carried out. The sub-range 28 also has a hysteresis range 29 with regard to load and speed.

Further possible conditions for activating the second operating mode include, for example, the temperature of the gasoline engine, in particular of its lubricant and/or coolant, being higher than 50°. In addition, a switch is made into the second operating mode, for example, only when a warm-up operation for heating up a catalytic converter of the gasoline engine as well as warm-up of the gasoline engine have concluded. Idling operation as well as start-stop operation are also carried out in the second operating mode with the lower valve lifts.

At least one exhaust gas turbocharger by means of which the gasoline engine may be supplied with compressed air, i.e., supercharged, is preferably associated with the gasoline engine. This results in particularly efficient operation of the gasoline engine.

As is apparent in particular with reference to FIG. 2, load control of the gasoline engine, i.e., adjustment of the load of the gasoline engine in the first characteristic map range 22, i.e., in the first operating mode, takes place by means of a throttle valve situated in the intake tract of the gasoline engine or by means of the supercharging by the exhaust gas turbocharger. For adjusting the load, the quantity or mass of the air flowing into the respective combustion chambers is adjusted.

In the second characteristic map range 24 with the second, smaller valve lifts, the load is adjusted by means of the throttle valve in a sub-range 30 of the second characteristic map range 24. The adjustment of the load via the camshaft, associated with the intake valves and referred to as the intake camshaft, takes place in a sub-range 32 of the second characteristic map range 24. The adjustment of the load (load control) via wastegate control in the supercharging range takes place in a sub-range 34 of the second characteristic map range 24. Wastegate control refers to the opening and closing of a valve element, referred to as a wastegate, of a bypass device of the exhaust gas turbocharger. The bypass device is associated with a turbine of the exhaust gas turbocharger, and includes a bypass duct via which exhaust gas from the gasoline engine flowing through the turbine can bypass, and thus cannot drive, a turbine wheel of the turbine.

The bypass duct may be fluidically blocked and fluidically enabled by means of the valve element (wastegate). If the bypass duct is fluidically blocked in a closed position of the valve element, exhaust gas cannot flow through the bypass duct. This means that at least essentially all of the exhaust gas drives the turbine wheel. The bypass duct is fluidically enabled in at least one open position of the valve element, so that the exhaust gas may at least partially bypass the turbine wheel, whereby the exhaust gas bypassing the turbine wheel does not drive the turbine wheel. Due to this opening and closing of the valve element (wastegate control), the power of the turbine, and thus the pressure of the compressed air to be supplied to the gasoline engine (charge pressure), and thus the quantity or mass of air to be supplied to the gasoline engine, may be adjusted.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A method for operating an internal combustion engine of a motor vehicle, the method comprising:
   directly injecting fuel into at least one combustion chamber of the internal combustion engine using at least one injection device; and
   igniting, by a spark ignition device, a mixture of fuel and air in the combustion chamber,
   wherein the internal combustion engine is operated selectively in:
      at least one first operating mode with at least one first valve lift of at least one gas exchange valve of the internal combustion engine, associated with the combustion chamber, and
      at least one second operating mode with at least one second valve lift of the gas exchange valve, which is smaller than the first valve lift,
   wherein a charge movement of the mixture in the second operating mode is assisted by at least one further injection of fuel directly into the combustion chamber, which is carried out prior to the ignition,
   wherein the internal combustion engine is operated in homogeneous operation in the second operating mode, and
   wherein the spark ignition device performs the ignition in the second operating mode.

2. The method of claim 1, wherein the further injection is carried out after the at least one first injection.

3. The method of claim 1, wherein in the second operating mode the ignition is a multi-spark ignition.

4. The method of claim 1, wherein a load setting of the internal combustion engine in the second operating mode is performed selectively or as a function of speed-load point of the internal combustion engine using
   at least one throttle valve situated in an intake tract of the internal combustion engine,
   a phase adjustment of a camshaft for actuating the gas exchange valve, or
   a supercharging rate of at least one exhaust gas turbocharger associated with the internal combustion engine.

5. The method of claim 1, wherein the internal combustion engine is operated in the second operating mode when at least one value characterizing at least a temperature of the internal combustion engine exceeds a predefined threshold value.

* * * * *